United States Patent [19]

Shedigian

[11] 4,420,791
[45] Dec. 13, 1983

[54] DIELECTRIC FLUID

[75] Inventor: Vandos Shedigian, Indianapolis, Ind.

[73] Assignee: Emhart Industries, Inc., Indianapolis, Ind.

[21] Appl. No.: 334,529

[22] Filed: Dec. 28, 1981

[51] Int. Cl.³ .............................................. H01G 4/22
[52] U.S. Cl. .................................... 361/319; 361/315; 361/327; 252/570; 252/578; 252/579; 174/17 LF
[58] Field of Search ....................... 252/570, 578, 579; 361/315, 319, 327; 174/17 LF

[56] References Cited

U.S. PATENT DOCUMENTS

| 3,619,745 | 11/1971 | Perigord | 252/578 |
| 3,948,788 | 4/1976 | Munch | 361/319 |
| 4,053,941 | 10/1977 | Shimizu et al. | 252/578 |
| 4,097,912 | 6/1978 | Lapp et al. | 361/315 |
| 4,110,496 | 8/1978 | Lapp et al. | 252/578 |
| 4,292,462 | 9/1981 | Rey-Coquais | 252/570 |
| 4,320,034 | 3/1982 | Lapp et al. | 361/315 |

Primary Examiner—John E. Kittle
Assistant Examiner—Hoa Van Le
Attorney, Agent, or Firm—Robert F. Meyer

[57] ABSTRACT

A dielectric fluid provides a mixture of a diarylethane compound and 10% to 80% by volume of an epoxide additive.

5 Claims, 2 Drawing Figures

DIELECTRIC FLUID

BACKGROUND OF THE INVENTION

1. Field Of The Invention

The present invention generally relates to dielectric fluids used in capacitors, and in particular, two such fluids as include epoxide compounds.

2. Statement Of The Prior Art

Epoxides have been used as acid scavengers in dielectric fluids for many years. Prior to the banning of the use of polychlorinated biphenyls, epoxides were used in small amounts therewith to reduce acidity and related dielectric failure. After the banning of polychlorinated biphenyls, many alternatives were sought as a replacement for PCBs. Various suitable and quasi suitable compounds were found for replacing PCBs and with the experiments were performed to determine if epoxides would also be useful with these compounds as an acid scavenger. In many cases, it was found that epoxides did indeed continue to act as acid scavengers when used in small amounts. One such compound currently used as a dielectric fluid and which enjoys the benefits of small amounts of epoxide additive is dioctylphthalate. Another such suitable dielectric compound is a mixture of phenylxylyl ethyne and an organic phosphorous compound such a phosphate or phosphite. This combination is described in U.S. Pat. No. 4,053,941 along with the various epoxide additives, which are used in amounts varying between 0.5 and 5% by weight of the combined mixture. Generally, the organic phosphorous compound discussed therein was necessary for improving the dielectric constant of the fluid as the dielectric constant of the phenylxylyl ethyne was generally of too low a value to be of practical usefulness in capacitor construction.

Generally, if a dielectric constant is too low, the dielectric will break down under electrical stress more easily than a dielectric having a higher dielectric constant. In order to use a compound having a low dielectric constant as a dielectric, the electrical stress under which it was placed would have to be severely limited, or in the case of a capacitor, the spacing between electrodes would have to be made too large for practical volumetric efficiency of the capacitor. Thusly, it is preferred that mixtures to be used as dielectric fluids in capacitors have high values of dielectric constant in order to improve the volumetric efficiency and electrical stress characteristics of capacitors constructed therewith.

SUMMARY OF THE INVENTION

Accordingly, the present invention provides a dielectric fluid including a mixture of a diarylethane compound and 10 to 80% by volume of an epoxide additive. The present invention concerns improving the dielectric constant of diarylethane compounds such as phenylxylyl ethane by the inclusion of an epoxide additive in a greater amount than that which has been previously used.

BRIEF DESCRIPTION OF THE DRAWINGS

The present invention is illustratively described and shown in reference to the appended drawings in which.

DISCUSSION OF THE INVENTION

Referring now to FI. 1, there is illustrated a convolutely wound a-c capacitor body 10. The capacitor body 10 includes a pair of dielectric layers 11 and 12 and overlying electrodes 13 and 14, respectively. Electrodes 13 and 14 are formed from any suitable conductor such as aluminum. Margins 15 and 16 are provided for preventing electrical short circuit between the electrodes. Suitable terminal leads 23 and 24 are attached to the electrodes 13 and 14 and extended from the same end of the capacitor body 10. One suitable lead material which could be used is tin coated copper.

The dielectric layers 11 and 12 should have high dielectric strength, low dissipation factor to prevent overheating, broad temperature range capabilities, chemical resistance to the dielectric fluid, and freedom from pinholes and conductive particles. Suitable dielectric layers 11 and 12 may be paper, a paper and polymeric film combination, or polymeric films. One commonly used polymeric film is polypropylene.

Figure 1:
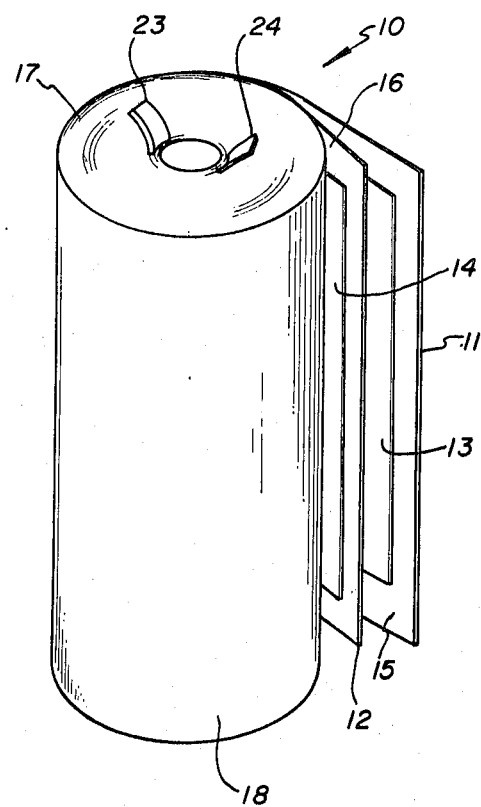
FIG. 1 of the drawing illustrates a convolutely wound a-c capacitor electrode constructed in accordance with one embodiment of the present invention.
Figure 2:
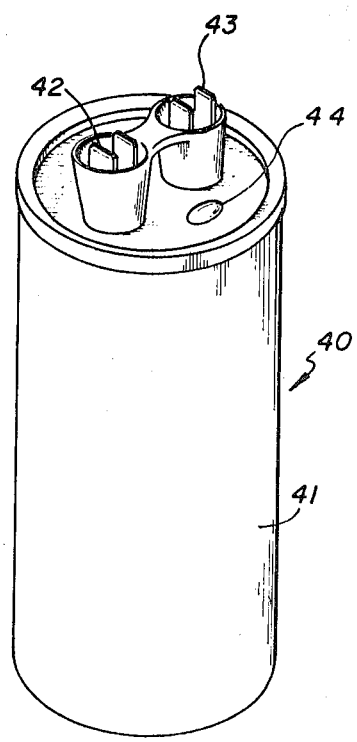
FIG. 2 is a perspective view of a completed capacitor including the electrode of FIG. 1.

In FIG. 2 the capacitor electrode body 10 is preferably sealed within a can or housing 40 to form a capacitor 41. Capacitor 41 includes the metal housing or can 40 and terminals 42 and 43. The capacitor electrode body 10 is contained within the housing 40. Terminal lead 23 makes electrical contact with terminal 42, and the remaining terminal lead 24 makes electrical contact with terminal 43.

After the capacitor body 10 is located within the can or housing 40, a dielectric fluid is generally impregnated into the can or housing 40, some times through a hole 44 located in the cover thereof. As mentioned, the dielectric fluid includes a mixture of a diarylethane compound such as phenylxylyl ethane and 10 to 80% by volume of an epoxide compound. One such epoxide compound which was found useful for purposes of the present invention is 3, 4-epoxycyclohexylmethyl-3, 4-epoxycyclohexane carboxylate. The preferred amount for inclusion of the epoxide is 30% by volume of the entire dielectric mixture. Once the mixture is prepared, it is refined through a chromatograph column using Fuller's earth or aluminum oxide and then heat dried in an evacuated oven. The fluid may then be introduced into the capacitor and/or housing preferably under conditions of heat and alternate evacuation and pressurization to atmospheric pressure, for the purpose of displacing all air left in the capacitor housing and the capacitor electrode body 10.

Test capacitors were constructed having identical dimensions and plate sizes for identical capacitance rating. These capacitors were impregnated in the first instance with a diarylethane compound and in the second instance with the diarylethane compound in combination with the preferred epoxide additive in the preferred amount of 30% by volume. All capacitors also included a small amount of thermal stabilizer sold under the tradename of Ethyl 330 by the Ethyl Corporation and a small amount of a phenolic antioxidant. Initial testing showed that the capacitors impregnated with the epoxide additive had at least 20% greater capacitance than those without epoxide. After life testing the capacitors for 1000 hours at 100° C. and under electrical stress, the epoxide impregnated capacitors retained this margin. Thusly, the addition of 30% by volume of the epoxide additive to the dielectric fluid having an otherwise low dielectric constant enables the improvement of the overall dielectric constant of that mixture to a suitable level for practical use.

The above described embodiment of the present invention is intended to be taken in an illustrative and not limiting sense. Various modifications and changes may be made by those skilled in the art to the above described embodiments without departing from the scope of the present invention as defined in the appened claims.

What is claimed is:

1. A dielectric fluid comprising a mixture of about 70% by volume of a diarylethane compound and about 30% by volume of an epoxide additive effective to improve the dielectric constant of the fluid.
2. The dielectric fluid of claim 1, wherein said diarylethane compound is phenylxylyl ethane.
3. The dielectric fluid of claim 2, wherein said epoxide additive is 3, 4 epoxycyclohexylmethyl-3, 4-epoxycyclohexane carboxylate.
4. The dielectric fluid of claim 2, further comprising a phenolic antioxidant.
5. A capacitor including the dielectric fluid of claim 1.

* * * * *